(12) United States Patent
Huang

(10) Patent No.: US 8,866,339 B2
(45) Date of Patent: Oct. 21, 2014

(54) POWER MANAGEMENT CIRCUIT

(75) Inventor: Ren-wen Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 409 days.

(21) Appl. No.: 13/339,212

(22) Filed: Dec. 28, 2011

(65) Prior Publication Data
US 2013/0026833 A1    Jan. 31, 2013

(30) Foreign Application Priority Data
Jul. 29, 2011   (CN) .......................... 2011 1 0215686

(51) Int. Cl.
*H02J 1/12* (2006.01)
*H02J 9/06* (2006.01)

(52) U.S. Cl.
CPC ........................................ *H02J 9/06* (2013.01)
USPC ............................................................. 307/46

(58) Field of Classification Search
USPC .............................................. 307/46; 320/128
See application file for complete search history.

(56) References Cited

U.S. PATENT DOCUMENTS
2010/0153757 A1*   6/2010   Li et al. .......................... 713/300

\* cited by examiner

*Primary Examiner* — Daniel Cavallari
(74) *Attorney, Agent, or Firm* — Novak Druce Connolly Bove + Quigg LLP

(57) ABSTRACT

A power management circuit includes an input, a switch circuit, a first control unit, a second control unit, and a voltage conversion circuit. The input is connected to a load and receives a first direct current (DC) voltage from an external power circuit. The switch circuit is connected between the load and a battery. The first control unit is configured to control whether the switch circuit is switched on or off, based on the first DC voltage and an output voltage of the battery. The voltage conversion circuit is configured to convert the first DC voltage into a second DC voltage and output the second DC voltage to charge the battery. The second control unit is configured to control whether the voltage conversion circuit converts the first DC voltage into the second DC voltage for charging the battery, based on the first DC voltage and the output voltage.

13 Claims, 2 Drawing Sheets

POWER MANAGEMENT CIRCUIT

BACKGROUND

1. Technical Field

The present disclosure relates to a power management circuit.

2. Description of Related Art

Portable electronic devices, are widely used. A portable electronic device may employ a power management unit (PMU) to manage the different voltages required in the portable electronic device. However, the PMU is usually expensive. As a result, the cost of the portable electronic device employing the PMU is high.

What is needed, therefore is a power management circuit that can overcome the aforementioned problems.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the various views.

DETAILED DESCRIPTION

Reference will be made to the drawings to describe specific exemplary embodiments of the present disclosure in detail.

Figure 1:
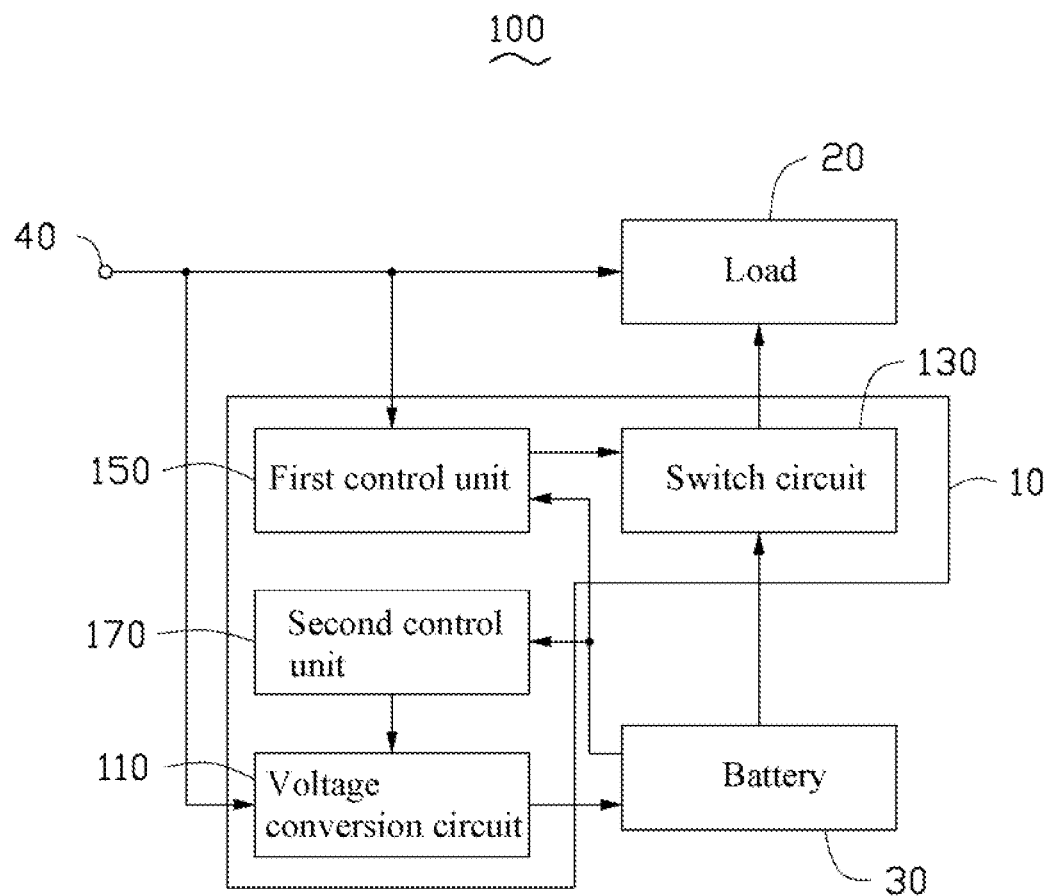
FIG. 1 is a block diagram of one embodiment of an electronic device including a power management circuit, a load, a battery, and an input.

FIG. 1 is a block diagram of one embodiment of an electronic device 100 including a power management circuit 10, a load 20, a battery 30, and an input 40. The input 40 is connected to the load 20 and the power management circuit 10. The power management circuit 10 is further connected to the load 20 and the battery 30. A cut-off discharge voltage is a particular voltage output by the battery 30 when the battery 30 is fully discharged, and an end-of-charge voltage is a particular voltage output by the battery 30 when the battery 30 is fully charged.

The input 40 receives a first direct current (DC) voltage from an external power circuit (not shown), and outputs the first DC voltage to the load 20, to the power management circuit 10, and also to a CPU (not shown). When the input 40 receives the first DC voltage, the power management circuit 10 disconnects the battery 30 from the load 20, converts the first DC voltage into a second DC voltage, and charges the battery 30 by means of the second DC voltage until the battery 30 is fully charged. Otherwise, when the input 40 is not being supplied with the first DC voltage, the power management circuit 10 connects the battery 30 to the load 20 on the basis that the output voltage of the battery 30 is more than the cut-off discharge voltage. The battery 30 may then output a third DC voltage to the load 20. In addition, the power management circuit 10 may nevertheless disconnect the battery 30 from the load 20 if the output voltage of the battery 30 sinks to the level of the cut-off discharge voltage. The first DC voltage may be, 18V, for example. The second DC voltage is more than the first DC voltage and may be 27V, for example. The third DC voltage is variable and simply equals the output voltage of the battery 30 when it is greater than the cut-off discharge voltage.

The power management circuit 10 includes a voltage conversion circuit 110, a switch circuit 130, a first control unit 150, and a second control unit 170. The voltage conversion circuit 110 is connected to the input 40, the second control unit 170, and the battery 30. The second control unit 170 is also connected to the battery 30. The first control unit 150 is connected to the battery 30, the input 40, and the switch circuit 130. The switch circuit 130 is also connected to the load 20 and battery 30.

The first control unit 150 switches off or switches on the switch circuit 130 based on whether the input 40 is supplied with the first DC voltage, and whether the output voltage of the battery 30 is at or below the cut-off discharge voltage when the input 40 is supplied with the first DC voltage. In detail, the first control unit 150 switches the switch circuit 130 off when the input 40 is supplied with the first DC voltage. The load 20 is disconnected from the battery 30 and driven directly by the first DC voltage. Otherwise, when the input 40 is not supplied with the first DC voltage and the output voltage of the battery 30 is more than the cut-off discharge voltage, the first control unit 150 switches the switch circuit 130 on. The battery 30 is connected to the load 20 and the load 20 is driven by the third DC voltage from the battery 30. In addition, when the input 40 is not supplied with the first DC voltage and the output voltage of the battery 30 is at or below the cut-off discharge voltage, the first control unit 150 switches off the switch circuit 130. The battery 30 is disconnected from the load 20 and the load 20 stops operating.

The second control unit 170 receives the output voltage from the battery 30 and the first DC voltage from the input 40, and controls the voltage conversion circuit 110 to convert the first DC voltage into the second DC voltage on condition that the output voltage of the battery 30 is equal to the end-of-charge voltage of the battery 30. The battery 30 is saturated with power when the output voltage of the battery 30 equals the end-of-charge voltage.

Figure 2:
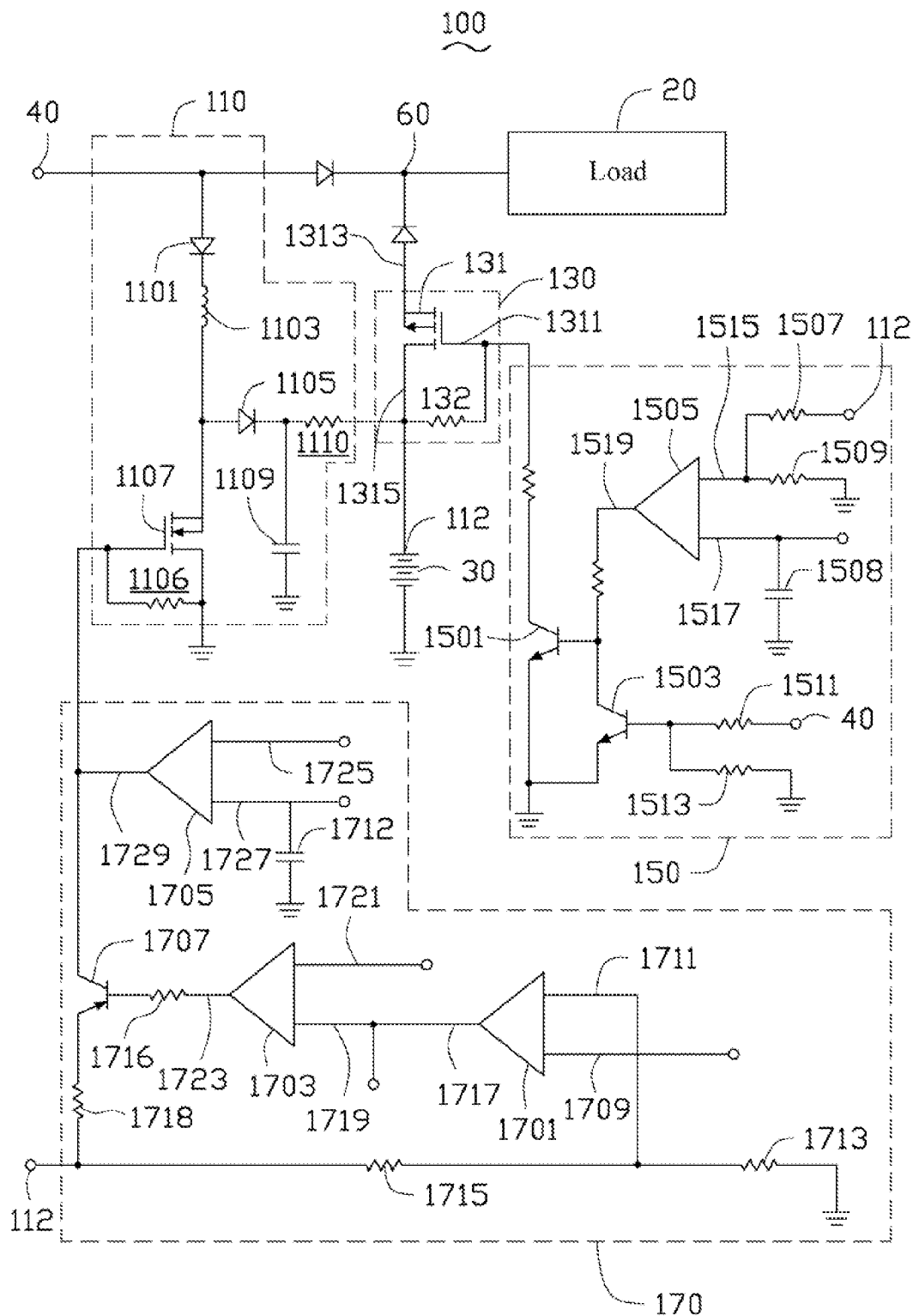
FIG. 2 is a circuit diagram of one embodiment of the power management circuit of FIG. 1.

FIG. 2 is a circuit diagram of one embodiment of the power management circuit 10. A node 60 is defined between the input 40 and the load 20. The switch circuit 130 may include a first transistor 131 and a first bias resistor 132. The first transistor 131 includes a first conductive electrode 1313 connected to the node 60 via a diode (not labeled) along a forward direction, a second conductive electrode 1315 is connected to a positive electrode 112 of the battery 30, and a control electrode 1311 is connected to the first control unit 150. The first bias resistor 132 is connected between the control electrode 1311 and a second conductive electrode 1315. A negative electrode (not labeled) of the battery 30 is connected to ground. The first transistor 131 may be, for example, a P-channel enhancement mode metal-oxide-semiconductor field effect transistor. The first conductive electrode 1313 is a source electrode, the second conductive electrode 1315 is a drain electrode, and the control electrode 1311 is a gate electrode.

The first control unit 150 may include a second transistor 1501, a third transistor 1503, a first operational amplifier 1505, a first resistor 1507, a second resistor 1509, a third resistor 1511, a fourth resistor 1513, and a storage capacitor 1508. The first operational amplifier 1505 includes a first input 1515, a second input 1517, and an output 1519. The first input 1515 is connected to ground via the second resistor 1509, and is further connected to the positive electrode 112 of the battery 30 via the first resistor 1507. The second input 1517 is connected to ground via the storage capacitor 1508, and is further connected to a voltage generating circuit (not shown) for receiving a reference voltage. A first conductive electrode of the second transistor 1501 is connected to the control electrode 1311 of the first transistor 130, a second conductive electrode of the second transistor 1501 is connected to ground, and a control electrode of the second transistor 1501 is connected to the output 1519 of the first operational amplifier 1505 via a resistor (not labeled). A first conductive electrode of the third transistor 1503 is connected to the control electrode of the second transistor 5101, a second conductive electrode of the third transistor 1503 is connected to ground, and a control electrode of the third transistor 1503 is connected both to ground via the fourth resistor 1513, and connected to the input 40 via the third resistor 1511. The second and third transistors 1501 and 1503 may both be NPN bipolar transistors, for example. The first conductive electrodes of the second and third transistors 1501 and 1503 are collectors, the second conductive electrodes of the second and third transistors 1501 and 1503 are emitters, and the control electrodes of the second and third transistors 1501 and 1503 are bases. A fourth DC voltage is generated at the first input 1515 of the first operational amplifier 1505. The voltage difference resulting from the output voltage of the battery 30 minus the fourth DC voltage equals the voltage difference resulting from the cut-off discharge voltage minus the reference voltage. Accordingly, the first operational amplifier 1505 compares the fourth DC voltage to the reference voltage, and determines whether the output voltage of the battery 30 is more than the cut-off discharge voltage. The reference voltage may be, 2.5V, for example.

In detail, when the input 40 is not being supplied with the first DC voltage, the third transistor 1503 is switched off. The first operational amplifier 1505 compares the fourth DC voltage to the reference voltage, outputs a first signal to the control electrode of the second transistor 1501 when the fourth DC voltage is more than the reference voltage, and outputs a second signal to the control electrode of the second transistor 1501 when the fourth DC voltage is not more than the reference voltage. The first signal may be a high voltage, 18V for example. The second signal may be a low voltage, 0V for example.

When the second transistor 1501 receives the first signal, the second transistor 1501 is switched on and outputs a first control signal to the first transistor 131. The first transistor 131 is switched on under the control of the first control signal. Accordingly, the output voltage from the battery 30 is output to the load 20 via the second and first conductive electrodes 1315 and 1313 and the diode. Otherwise, when the second transistor 1501 receives the second signal, the second transistor 1501 is switched off and outputs a second control signal to the first transistor 131. The first transistor 131 is switched off under the control of the second control signal. Accordingly, the battery 30 is disconnected from the load 20, and the load 20 stops functioning. The first control signal may be a low voltage, 0V for example. The second control signal may be a high voltage, 5V for example.

When the input 40 is supplied with the first DC voltage, the third transistor 1503 is switched on. Accordingly, the second transistor 1501 is switched off, and outputs the second control signal to the first transistor 131. The first transistor 131 is then switched off. The load 20 receives the first DC voltage via the input 40 and is driven directly by the first DC voltage.

The voltage conversion circuit 110 may include a first diode 1101, an inductor 1103, a second diode 1105, a second bias resistor 1106, a fourth transistor 1107, a capacitor 1109 and a filter resistor 1110. An anode of the first diode 1101 is connected to the input 40, and a cathode of the first diode 1101 is connected to an anode of the second diode 1105 via the inductor 1103. A cathode of the second diode 1105 is connected to the positive electrode 112 via the filter resistor 1110. The capacitor 1109 is connected between ground and a node formed between the second diode 1105 and the filter resistor 1110. A first conductive electrode of the fourth transistor 1107 is connected to a node between the inductor 1103 and the second diode 1105, a second conductive electrode of the fourth transistor 1107 is connected to ground, and a control electrode of the fourth transistor 1107 is connected to the second control unit 170, and further is connected to the second conductive electrode of the fourth transistor 1107 via the second bias resistor 1106. The fourth transistor 1107 may be, for example, an N-channel enhancement mode metal-oxide-semiconductor field effect transistor. The first conductive electrode of the fourth transistor 1107 is a source electrode, the second conductive electrode of the fourth transistor 1107 is a drain electrode, and a control electrode of the fourth transistor 1107 is a gate electrode.

Specifically, when the input 40 is supplied with the first DC voltage and the output voltage of the battery 30 is less than the end-of-charge voltage, the second control unit 170 continuously switches the fourth transistor 1107 on and off, based on the output voltage of the battery 30, and then the first DC voltage is converted into the second DC voltage via the cooperation of the fourth transistor 1107, the first diode 1101, the inductor 1103, the second diode 1105 and the capacitor 1109. In detail, when the fourth transistor 1107 is switched on, the inductor 1103 is charged by the first DC voltage because a voltage of the node between the inductor 1103 and the second diode 1105 is substantially equivalent to 0V, and there is no current flowing to the capacitor 1109 because the second diode 1105 is not switched on. When the fourth transistor 1107 is switched off, the inductor 1103 discharges electricity to the second diode 1105, and then the second diode 1105 is switched on. Accordingly, the capacitor 1109 is charged. The first DC voltage is converted into the second DC voltage after the capacitor 1109 has been charged a predetermined or at least a predictable number of times as a result of the above operation. In addition, noises are filtered by the capacitor 1109 and the filter resistor 1110. The battery 30 is then charged by the second DC voltage until the output voltage of the battery 30 equals to the end-of-charge voltage. The second control unit 170 switches off the fourth transistor 1107 when the battery 30 is fully charged.

The second control unit 170 may be a pulse width modulation (PWM) circuit, for example. The second control unit 170 may include a second operational amplifier 1701, a third operational amplifier 1703, a fourth operational amplifier 1705, a fifth transistor 1707, a second storage capacitor 1712, a current-limiting resistor 1716, a pull-up resistor 1718, a first voltage grading resistor 1713 and a second voltage grading resistor 1715. The second operational amplifier 1701 includes a first input 1709, a second input 1711, and an output 1717. The third operational amplifier 1703 includes a first input 1719, a second input 1721, and an output 1723. The fourth operational amplifier 1705 includes a first input 1725, a second input 1727, and an output 1729. The first voltage grading resistor 1713 and the second voltage grading resistor 1715 are connected between the positive electrode 112 of the battery 30 and ground in series. The first input 1709, the second input 1721 of the third operational amplifier 1703 and the second input 1727 of the fourth operational amplifier 1705 are connected to the voltage generating circuit to receive the reference voltage. The second input 1727 of the fourth operational amplifier 1705 is further connected to ground via the second storage capacitor 1712. The first input 1725 of the fourth operational amplifier 1705 is connected to an output of the CPU, with an input of the CPU connecting to a node between the first voltage grading resistor 1713 and the second voltage grading resistor 1715. The output 1729 is connected to the control electrode of the fourth transistor 1107. The second input 1711 of the second operational amplifier 1701 is connected to the node between the first voltage grading resistor 1713 and the second voltage grading resistor 1715. The first input 1719 of the third operational amplifier 1703 is connected to the output 1717 of the second operational amplifier 1701, and is further connected to the output of the CPU. A first conductive electrode of the fifth transistor 1707 is connected to the positive electrode 112 via the pull-up resistor 1718, a second conductive electrode of the fifth transistor 1707 is connected to the control electrode of the fourth transistor 1107, and a control electrode of the fifth transistor 1707 is connected to the output 1723 of the third operational amplifier 1703 via the current-limiting resistor 1716. The fifth transistor 1707 may be, for example, a PNP bipolar transistor. The first conductive electrode of the fifth transistor 1707 is an emitter, the second conductive electrode of the fifth transistor 1707 is a collector, and the control electrode of the fifth transistor is a base.

In detail, when the input 40 is not being supplied with the first DC voltage, the first inputs 1719 and 1725 receive a first control voltage from the output of the CPU. The first control voltage is less than or equal to the reference voltage. The fourth operational amplifier 1705 outputs a third control signal to the control electrode of the fourth transistor 1107 via the output 1729 based on a comparison, and then the fourth transistor 1107 is switched off. The third operational amplifier 1703 outputs a first cutoff voltage to the control electrode of the fifth transistor 1707 via the current-limiting resistor 1716, and then the fifth transistor 1707 is switched off.

When the input 40 is supplied with the first DC voltage and the output voltage of the battery 30, which is fed back by the node between the first and second voltage grading resistors 1713 and 1715, is less than the end-of-charge voltage, the second operational amplifier 1701 outputs a voltage via the output 1717. The voltage is not a high voltage enabling the third operational amplifier 1703 to output a break-over voltage so as to switch on the fifth transistor 1707. The third operational amplifier 1703 outputs a first PWM signal to the fifth transistor 1707 via the current-limiting resistor 1716 based on the reference voltage and a control voltage from the CPU. The control voltage from the CPU includes the first control voltage and a second control voltage. The first PWM signal includes the first cut-off voltage and the break-over voltage. The third operational amplifier 1703 outputs the break-over voltage when the first input 1719 receives the second control voltage. In addition, the fourth operational amplifier 1705 outputs a second PWM signal to the fourth transistor 1107 based on the reference voltage and the control voltage from the CPU. The second PWM signal includes the third control signal and a fourth control signal. The fourth operational amplifier 1705 outputs the fourth control signal when the first input 1725 receives the second control voltage. The fourth transistor 1107 is switched on when the fourth transistor 1107 receives the fourth control signal. There is a phase inversion between the first PWM signal and the second PWM signal. A frequency of the first and second PWM signals is 50 KHZ. Accordingly, the fourth transistor 1107 is continuously switched on and off during the period of time when the battery 30 is charged.

When the output voltage of the battery 30 is equivalent to the end-of-charge voltage, the battery 30 is fully charged. The voltage of the node between the first and second voltage grading resistors 1713 and 1715 is correspondingly more than the reference voltage. Accordingly, the second operational amplifier 1701 outputs a second cut-off voltage, which is less than the reference voltage, to the first input 1719. The third operational amplifier 1703 outputs a constant first cut-off voltage to the fifth transistor 1707 based on the second cut-off voltage and the reference voltage, and then the fifth transistor 1707 is switched off. In addition, the first input 1725 of the fourth transistor 1705 receives the first control voltage from the CPU, and then the fourth control signal is outputted to the fourth transistor 1107 via the output 1729. Accordingly, the fourth transistor 1107 is switched off after the battery 30 is fully charged.

As described, since the power management circuit 10 is formed using very simple electronic components, the power management circuit 10 is cheap. As a result, the cost of the power management circuit 10 in the electronic device 100 is low.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A power management circuit, comprising:
   an input connected to a load and configured to receive a first direct current (DC) voltage from an external power circuit;
   a switch circuit connected between the load and a battery that provides an output voltage to the load;
   a first control unit configured to switch on or switch off the switch circuit, based on whether the input is supplied with the first DC voltage, and whether the output voltage of the battery is at or below a cut-off discharge voltage when the input is supplied with the first DC voltage;
   a voltage conversion circuit configured to convert the first DC voltage into a second DC voltage, the second DC voltage for charging the battery; and
   a second control unit configured to control whether the voltage conversion circuit converts the first DC voltage into the second DC voltage for charging the battery, based on whether the input is supplied with the first DC voltage, and whether the output voltage of the battery is equal to an end-of-charge voltage of the battery when the input is supplied with the first DC voltage.

2. The power management circuit of claim 1, wherein the first control unit comprises a first transistor, a second transistor and a first resistor, a first conductive electrode of the first transistor is connected to the switch circuit, a second conductive electrode of the first transistor is connected to ground, and a control electrode of the first transistor is connected to a first conductive electrode of the second transistor, a second conductive electrode of the second transistor is connected to ground, and a control electrode of the second transistor is connected to the input, when the input is supplied with the first DC voltage, the first control unit switches the switch circuit off.

3. The power management circuit of claim 2, wherein when the input is not supplied with the first DC voltage, the first control unit switches on the first switch circuit on condition that the output voltage is more than the cut-off discharge voltage of the battery.

4. The power management circuit of claim 3, wherein when the input is not supplied with the first DC voltage, the first control unit switches off the switch circuit, and then the battery stops providing the output voltage to the load on condition that the output voltage is not more than the cut-off discharge voltage of the battery.

5. The power management circuit of claim 4, wherein the first control unit further comprises a first operational amplifier and a second resistor, a first input of the first operational amplifier is connected to a positive electrode of the battery via the second resistor, a second input of the first operational amplifier is connected to a voltage generating circuit for providing a reference voltage to the second input, and an output of the first operational amplifier is connected to the control electrode of the first transistor.

6. The power management circuit of claim 1, wherein the voltage conversion circuit comprises a third transistor, a first diode, a first storage component, a second diode, a second storage component and a filter resistor, an anode of the first diode is connected to the input, a cathode of the first diode is connected to a first conductive electrode of the third transistor via the first storage component, and is further connected to an anode of the second diode, a cathode of the second diode is connected to a positive electrode of the battery via the filter resistor, the second storage component is connected between a node located between the cathode of the second diode and the filter resistor and ground, a second conductive electrode of the third transistor is connected to ground, and a control electrode is connected to the second control unit.

7. The power management circuit of claim 6, wherein when the input is supplied with the first DC voltage and when the output voltage of the battery is less than the end-of-charge voltage, the third transistor is continuously switched on and off under the control of a first pulse width modulation (PWM) signal from the second control unit, and the voltage conversion circuit correspondingly converts the first DC voltage into the second DC voltage.

8. The power management circuit of claim 7, wherein when the input is supplied with the first DC voltage and when the output voltage of the battery is equal to the end-of-charge voltage, the third transistor is switched off all the time under the control of a first control signal comprised in the first PWM signal, and then the voltage conversion circuit stops converting the first DC voltage into the second DC voltage.

9. The power management circuit of claim 8, wherein when the input is not supplied with the first DC voltage, the third transistor is switched off all the time under the control of the first control signal comprised in the first PWM signal, and the voltage conversion circuit does not convert the first DC voltage into the second DC voltage.

10. The power management circuit of claim 6, wherein the second control unit comprises a fourth transistor, a second operational amplifier, a third operational amplifier, a fourth operational amplifier, a third resistor, a fourth resistor and a fifth resistor, the fourth resistor and the fifth resistor are connected between the positive electrode of the battery in series, a non-inverted input of the second operational amplifier, a non-inverted input of the third operational amplifier and an inverted input of the fourth operational amplifier are inputted a reference voltage from a voltage generating circuit, an inverted input of the second operational amplifier is connected to a node located between the third and fourth resistors, an output of the second operational amplifier is connected to a non-inverted input of the third operational amplifier, the non-inverted input of the third operational amplifier is further connected to an output of a CPU, an output of the operational amplifier is connected to a control electrode of the fourth transistor, a non-inverted input of the fourth operational amplifier is connected to the output of the CPU, a first conductive electrode of the fourth operational amplifier is connected to the positive electrode of the battery via the fifth resistor, a negative electrode of the battery is connected to ground, and a second conductive electrode of the fourth the positive electrode of the battery is connected to an output of the fourth operational amplifier.

11. The power management circuit of claim 10, wherein when the input is supplied with the first DC voltage and when the output voltage of the battery is equal to the end-of-charge voltage, the output of the second operational amplifier outputs a first voltage to the inverted input of the third operational amplifier, the non-inverted input of the fourth operational amplifier and inverted input of the third operational amplifier receives a control voltage from the CPU, and outputs a first pulse width modulation (PWM) signal and a second PWM signal respectively, and when the fourth transistor is switched on/off by the second PWM signal, the third transistor is switched on/off by the first PWM signal.

12. The power management circuit of claim 11, wherein the control voltage from the CPU comprises a first control voltage and a second control voltage, when the second control unit receives the first control voltage, the second control unit outputs a first control signal to switch on the third transistor, and when the second control unit receives the second control voltage, the second control unit outputs a second control signal to the third transistor, and then the third transistor is switched off.

13. The power management circuit of claim 12, wherein when the input is supplied with the first DC voltage and when the output voltage of the battery is less than the end-of-charge voltage, the output of the second operational amplifier outputs a second voltage to the inverted input of the third operational amplifier, the third operational amplifier outputs the second control signal to switch off the fourth transistor, the fourth operational amplifier receives the second control voltage from the CPU, the second control signal switches off the third transistor.

* * * * *